US012407155B2

United States Patent
Baseri et al.

(10) Patent No.: US 12,407,155 B2
(45) Date of Patent: Sep. 2, 2025

(54) HIGH VOLTAGE LAMINATED POWER DISTRIBUTION SYSTEM WITH INTEGRATED FUSES

(71) Applicant: Rivian IP Holdings, LLC, Plymouth, MI (US)

(72) Inventors: Ehsan Baseri, Irvine, CA (US); Kyle Butterfield, Ladera Ranch, CA (US); Kyle O'Neil, Los Angeles, CA (US); Tyler Collins, Irvine, CA (US); Nathaniel C. Wynn, Tustin, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 267 days.

(21) Appl. No.: 18/199,167

(22) Filed: May 18, 2023

(65) Prior Publication Data

US 2023/0291193 A1 Sep. 14, 2023

Related U.S. Application Data

(63) Continuation of application No. 17/222,437, filed on Apr. 5, 2021, now Pat. No. 11,670,928, which is a
(Continued)

(51) Int. Cl.
*H01R 13/68* (2011.01)
*H01H 85/20* (2006.01)
(Continued)

(52) U.S. Cl.
CPC .......... *H02G 5/005* (2013.01); *H01H 85/205* (2013.01); *H01M 50/505* (2021.01);
(Continued)

(58) Field of Classification Search
CPC .... H02G 5/005; H01M 50/51; H01M 50/522; H01M 50/505; H01M 50/588;
(Continued)

(56) References Cited

U.S. PATENT DOCUMENTS

| 4,346,257 A | * | 8/1982 | Moss | H02G 5/005 |
| | | | | 174/72 B |
| 5,872,711 A | * | 2/1999 | Janko | F28F 21/084 |
| | | | | 174/72 B |

(Continued)

FOREIGN PATENT DOCUMENTS

CN 103094201 A 5/2013

OTHER PUBLICATIONS

Iclodean et al: Comparison of Different Battery Types for Electric Vehicles, IOP Conference Series: Materials Science and Engineering, 252:012058 (2017) (11 pages).
(Continued)

*Primary Examiner* — Timothy J Thompson
*Assistant Examiner* — Michael F McAllister
(74) *Attorney, Agent, or Firm* — Haley Guiliano LLP

(57) ABSTRACT

A high voltage distribution system is provided with multiple fuses. The high voltage distribution system includes multiple laminated busbars that are electrically coupled to a battery and to the multiple fuses. Busbars are electrically coupled to the one or more fuses via electrical connections between the busbars and the fuses. The electrical connections can pass through other busbars without having an electrical coupling to the other busbars. An insulating layer may be used between the busbars to prevent overcurrent events. The configuration, size, and position of each busbar is selected based on the electrical requirements of components that are electrically coupled to the busbar and based on the prevention of overcurrent events.

17 Claims, 3 Drawing Sheets

Related U.S. Application Data continuation of application No. 16/680,857, filed on Nov. 12, 2019, now Pat. No. 10,971,912.

(60) Provisional application No. 62/760,794, filed on Nov. 13, 2018.

(51) Int. Cl.
| | |
|---|---|
| *H01M 50/204* | (2021.01) |
| *H01M 50/505* | (2021.01) |
| *H01M 50/51* | (2021.01) |
| *H01M 50/522* | (2021.01) |
| *H01M 50/524* | (2021.01) |
| *H01M 50/526* | (2021.01) |
| *H01M 50/583* | (2021.01) |
| *H01M 50/588* | (2021.01) |
| *H02G 5/00* | (2006.01) |

(52) U.S. Cl.
CPC ......... *H01M 50/51* (2021.01); *H01M 50/522* (2021.01); *H01M 50/524* (2021.01); *H01M 50/526* (2021.01); *H01M 50/583* (2021.01); *H01M 50/588* (2021.01); *H01R 13/68* (2013.01); *H01M 50/204* (2021.01); *H01M 2200/103* (2013.01)

(58) Field of Classification Search
CPC ............. H01M 50/526; H01M 50/524; H01M 50/583; H01M 50/204; H01M 2200/103; H01H 85/205; H01R 13/68
USPC ....................................................... 174/72 B
See application file for complete search history.

(56) References Cited

U.S. PATENT DOCUMENTS

| | | | |
|---|---|---|---|
| 9,340,115 B2* | 5/2016 | Yokoyama | H01M 50/291 |
| 10,333,129 B2* | 6/2019 | Zhao | H01M 50/507 |
| 2009/0297892 A1* | 12/2009 | Ijaz | H01M 10/643 |
| | | | 219/121.64 |
| 2013/0288530 A1* | 10/2013 | Zhao | H01M 50/503 |
| | | | 439/627 |
| 2013/0337294 A1* | 12/2013 | Achhammer | H01M 10/46 |
| | | | 429/61 |
| 2014/0255750 A1* | 9/2014 | Jan | H01M 50/213 |
| | | | 429/158 |
| 2015/0072177 A1* | 3/2015 | Soleski | H01M 10/4257 |
| | | | 429/7 |
| 2016/0172642 A1* | 6/2016 | Hughes | H01M 50/227 |
| | | | 429/130 |
| 2016/0315304 A1* | 10/2016 | Biskup | H01M 50/507 |
| 2017/0012271 A1* | 1/2017 | Dinkelman | H01H 47/325 |
| 2017/0125773 A1* | 5/2017 | Liu | B23K 15/008 |
| 2017/0141378 A1* | 5/2017 | Biskup | H01M 50/581 |
| 2017/0179548 A1* | 6/2017 | Lee | H01H 85/10 |
| 2017/0256770 A1* | 9/2017 | Wynn | H01M 50/213 |
| 2018/0033525 A1* | 2/2018 | Chen | H01B 3/40 |
| 2018/0069211 A1* | 3/2018 | Mastrandrea | H01M 50/227 |
| 2018/0083251 A1* | 3/2018 | Newman | B60L 3/04 |
| 2018/0315986 A1* | 11/2018 | Hirano | H01M 50/209 |
| 2019/0036099 A1* | 1/2019 | Hirano | H01M 50/298 |
| 2019/0296541 A1* | 9/2019 | Mensch | B60L 3/04 |
| 2019/0319448 A1* | 10/2019 | Pevear | H02J 7/00304 |
| 2022/0021046 A1* | 1/2022 | Shi | H01M 50/124 |

OTHER PUBLICATIONS

International Search Report and Written Opinion received for PCT Patent Application No. PCT/US19/060858 dated Mar. 20, 2020.

* cited by examiner

HIGH VOLTAGE LAMINATED POWER DISTRIBUTION SYSTEM WITH INTEGRATED FUSES

CROSS-REFERENCE TO RELATED APPLICATIONS

This application is a continuation application of U.S. patent application Ser. No. 17/222,437, filed Apr. 5, 2021, which is a continuation of U.S. patent application Ser. No. 16/680,857, filed Nov. 12, 2019, which claims the benefit of U.S. Provisional Application No. 62/760,794, filed Nov. 13, 2018. The entire contents of which are incorporated by reference herein in their entireties.

INTRODUCTION

Electric vehicles typically include a plurality of components which each have unique current and/or voltage requirements. For example, an electric vehicle drive unit may require 300 V and a maximum current of 500 A to operate, but a compressor may require 300 V and a maximum current of 40 A to operate. To protect the vehicle's components from damage caused by an electrical short, fuses that can interrupt a short circuit when an overcurrent event occurs are placed in series with a negative or positive path leading to the component. An interrupting current of the fuse is typically selected based on an expected maximum electrical load of the component (e.g., approximately 40 A for the compressor).

Conventional vehicles place the fuses for the multiple components in a single location, called a fuse box. The fuse box is typically located remote to both a battery that powers the components and the components themselves. Accordingly, wires typically run from a location of the battery in the vehicle to the location of the fuse box in the vehicle, and then from the location of the fuse box to the individual components. If the fuse box is not placed along a direct path between the battery and the components, this will result in wasted wiring and an increased vehicle weight. In some instances, the wires leading to the fuse box are not fused themselves, thus posing a risk for uninterrupted shorts if the short occurs in a location electrically preceding the fuse box.

SUMMARY

In some embodiments, a high voltage distribution system is provided. The high voltage distribution system comprises a first busbar, corresponding to a first electrically conductive layer, and a second busbar, corresponding to a second electrically conductive layer. The high voltage distribution system further comprises a plurality of fuses electrically coupled to the first busbar. The first busbar, the second busbar, and the plurality of fuses are located within a battery enclosure. In some embodiments, the first busbar and the second busbar are made of copper or aluminum. In some embodiments, the first busbar and the second busbar are insulated busbars.

In some embodiments, an insulating layer is located between the first electrically conductive layer the second electrically conductive layer. The insulating layer may comprise at least one of a powder coating, plastic, heat shrink, or rubber. In some embodiments, the first electrically conductive layer is located beneath the second electrically conductive layer. In such embodiments, a top surface of the first electrically conductive layer is laminated to a bottom surface of the insulating layer; and a bottom surface of the second electrically conductive layer is laminated to a top surface of the insulating layer. In some embodiments, less than all of the top surface of the first busbar is laminated to the bottom surface of the insulating layer. In other embodiments, less than all of the bottom surface of the second busbar is laminated to the top surface of the insulating layer.

In some embodiments, the plurality of fuses are located above the second electrically conductive layer. In some embodiments, an electrically insulating layer is located between the second electrically conductive layer and the plurality of fuses. In such embodiments, a fuse may be electrically coupled to the first busbar via a pad located on the surface of the insulating layer.

In some embodiments, the high voltage distribution system further comprises an electrically conductive vertical interconnect that is electrically coupled to the first busbar in the first electrically conductive layer and passes through the second electrically conductive layer without an electrical coupling to the second busbar. In such embodiments, the vertical interconnect may additionally pass through an insulating layer between the first electrically conductive layer and the second electrically conductive layer.

In some embodiments, the high voltage distribution system comprises a battery wherein the battery is electrically coupled to one of the first and the second busbars. In some embodiments, the battery has an electrical potential of at least 300 V. In some embodiments, the electrical potential across the first busbar and a negative terminal of the battery is within 10 and 14 volts. In some embodiments, a super capacitor is electrically coupled to one of the first and the second busbars. In some embodiments, each of the plurality of fuses is electrically coupled to a respective load in an electric vehicle.

In some embodiments, the busbars comprise a first terminal and a second terminal. The busbar may comprise a material having a non-zero electrical resistivity electrically coupling the first terminal to the second terminal. The first terminal may be electrically coupled to a terminal of the battery and the second terminal may be electrically coupled to a load. An electrical potential across the first terminal and the second terminal does not exceed 14 volts while coupled to the load.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Fuse boxes in modern vehicles are often located remote to a battery and to the components that are powered by the battery. Because of the remote location, wires are run from a location of the battery to the location of the fuse box, then from the location of the fuse box to the various locations of the individual components. This wiring, in addition to adding bulk to the fuse box itself, adds weight to the vehicle and results in some wires, such as those leading to the fuse box, to not be fused themselves. The presence of long runs of unfused wires poses a risk for uninterrupted shorts if the short occurs in a location electrically preceding the fuse box.

In view of the foregoing, it would be advantageous to provide a high voltage distribution system in an electric vehicle that minimizes the space, weight, and amount of wiring required to protect components in the vehicle. Accordingly, the high voltage distribution system described herein provides a safety mechanism for protecting components in an electric vehicle while minimizing an amount of space required by the system. Specifically, the system described herein comprises a plurality of fuses electrically coupled to a laminated busbar system in a battery enclosure of the electric vehicle. The system described herein additionally minimizes the risk of uninterrupted short circuits by minimizing a distance between a power source (e.g., battery, capacitor, generator, etc.) and a fuse.

For example, the system described herein integrates multiple fuses to a laminated busbar. A conductive material, such as a vertical interconnect, a busbar, a wire, a pad, etc., electrically couples the fuses to a busbar within the laminated busbar assembly, without the need for running additional wires to fuses located remote to the battery enclosure. The resultant system is compact and lightweight because wires do not need to be run to an external fuse box. Additionally, because no unfused wires are routed outside of the battery enclosure, the risk of a short is minimized.

Figure 1:
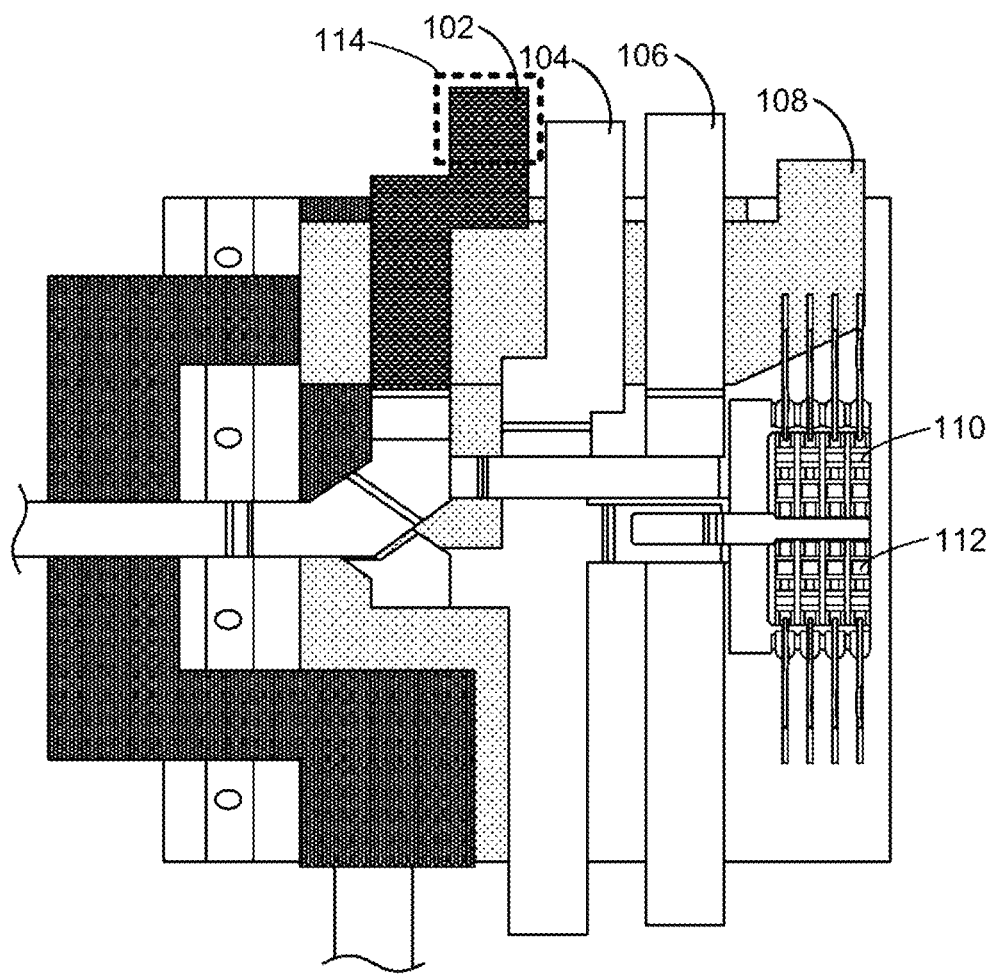
FIG. 1 shows an exemplary high power distribution system, in accordance with some embodiments of the present disclosure.

FIG. 1 depicts an exemplary embodiment of the high voltage distribution system described herein. High voltage distribution system 100 is depicted having a plurality of laminated busbars (e.g., busbars 102, 104, 106 and 108) and a plurality of fuses (e.g., fuses 110 and 112). Each of the plurality of laminated busbars (e.g., busbars 102, 104, 106, and 108) may be vertically stacked above one another. For example, an unswitched power busbar that is electrically coupled to a battery (e.g., busbar 106) may be stacked on top of a switched accessory power busbar (e.g., busbar 108), for an air conditioner compressor. An amount of space between the unswitched power busbar (e.g., busbar 106) and the accessory power busbar (e.g., busbar 108) may be chosen such that a distance between the two busbars minimizes, if not eliminates, the risk of arcing or shorting between the busbars. In some embodiments, the busbars may be electrically insulated from each other using an insulating material. A type of the insulating material and a quantity of insulating material between the two busbars may be chosen to achieve electrical isolation between the two busbars. As an example, the unswitched power busbar (e.g., busbar 106) may be routed through a first conductive plane and the accessory power busbar (e.g., busbar 108) may be routed through a second conductive plane. An insulating layer (e.g., a layer of rubber) may be placed between the first conductive plane, and the second conductive plane to prevent shorting or arcing between the accessory power busbar and the unswitched power busbar.

In some embodiments, one or more busbars may occupy a single conductive plane and may be routed such that the two busbars are electrically isolated from each other. For example, busbar 104 and busbar 106 may occupy a single conductive plane, and may be routed parallel to each other such that busbar 104 and busbar 106 are electrically isolated from each other. In some embodiments, a distance separating two busbars on a single conductive plane is chosen to eliminate the risk of shorting or arcing between the two busbars (e.g., busbars 104 and 106). In such embodiments, the electrically conductive plane may further comprise an electrically insulating material between the two busbars. For example, the electrically conductive plane may comprise a non-metallic electrical isolator, such as ceramic, between the two busbars (e.g., busbars 104 and 106).

In some embodiments, one or more of the busbars (e.g., busbar 102, 104, 106 and/or 108) are insulated busbars (e.g., busbars coated or wrapped in an insulating material). In some embodiments, a percentage of the busbar is uninsulated to enable the busbar to connect to external components. For example, a busbar (e.g., busbar 102) may be insulated by the insulating layer on all sides except for a tab that is several centimeters in length to allow for the busbar to electrically connect to other components (e.g., a battery terminal). For example, busbar 102 may be coated in a rubber-based material surrounding all sides of busbar 102. A portion of busbar 102, depicted in region 114, may be uninsulated to allow for busbar 102 to connect to an external component, such as a battery, a charge port, a drive controller, etc. In such embodiments, the busbar may be configured to terminate within a threshold distance of a connector for the battery such that the busbar can be electrically coupled to the battery without requiring additional conductors.

Each busbar (e.g., busbar 102, 104, 106, and 108) may be sized based on an expected maximum power load expected to be conducted by the busbar. For example, the unswitched power busbar may be electrically coupled to a battery having an electrical potential of 300 V. A maximum current of 1000 A (e.g., based on the battery characteristics) may pass through the unswitched power busbar. Accordingly, the unswitched power busbar may be selected to be a highly conductive material (e.g., silver, copper, gold, aluminum, etc.) and may be sized to minimize heat caused by conducting a 300 kW power load across the unswitched power busbar. In contrast, a busbar conducting a lower power load (e.g., a 12 kW compressor), such as the accessory power busbar, may be sized smaller than the switched power busbar. In some embodiments, each of the busbars (e.g., busbar 102, 104, 106, and 108) may be coupled to one or more fuses (e.g., fuses 110 and 112) via an electrical coupling (e.g., a pad, a wire, a vertical interconnect, etc.). Electrical couplings between busbars and fuses is discussed further with respect to FIGS. 3-5.

Figure 2:
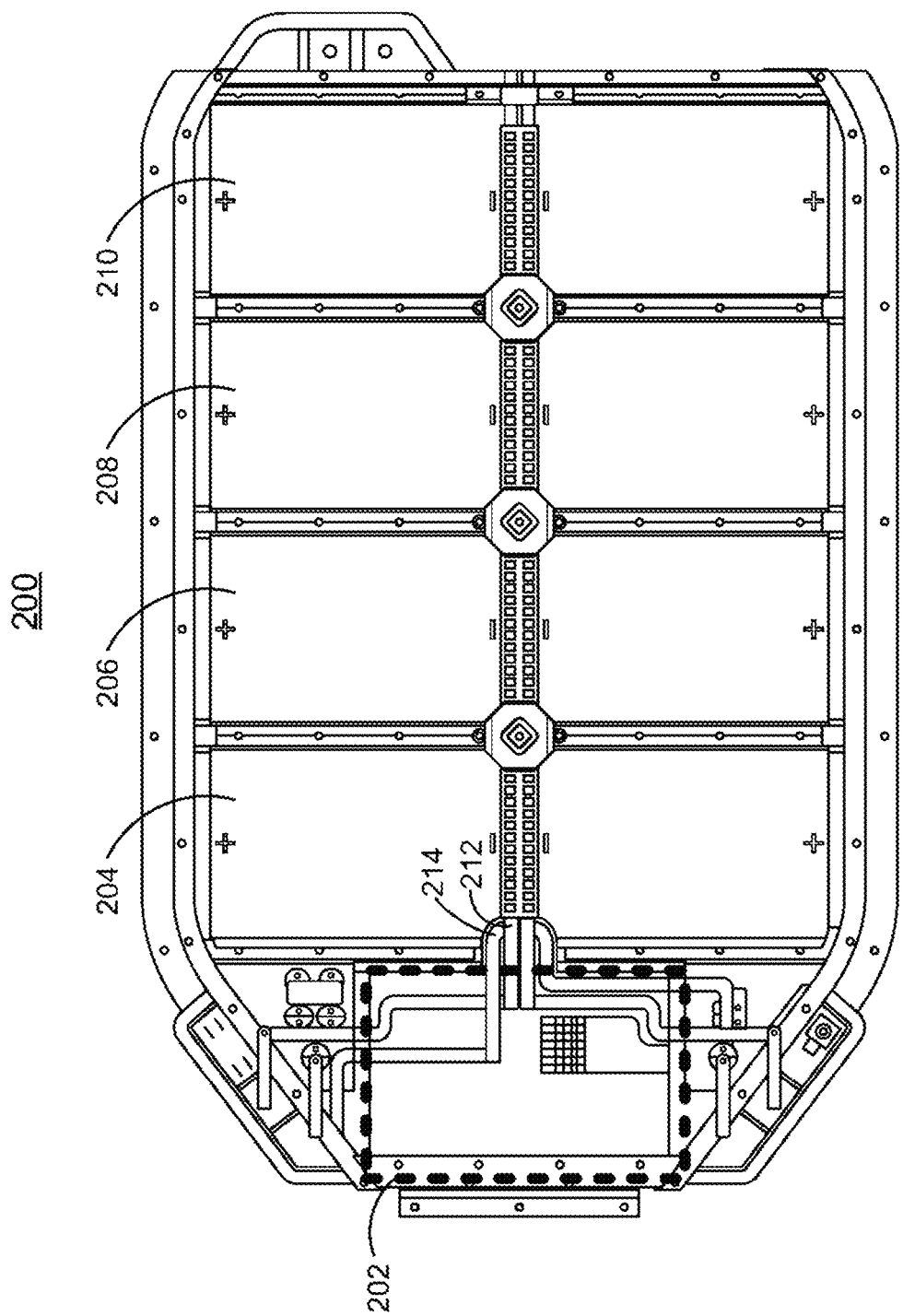
FIG. 2 shows an illustrative high voltage distribution system within a battery enclosure having an arrangement of laminated busbars with integrated fuses, in accordance with some embodiments of the present disclosure.

FIG. 2 depicts an exemplary battery enclosure comprising the power distribution system described herein. Battery enclosure 200 is depicted having a plurality of battery modules connected in series (e.g., battery modules 204, 206, 208, and 210), a plurality of busbars (e.g., busbars 212 and 214), and a high voltage distribution system (e.g., high voltage distribution system 100 depicted in region 202). In some embodiments, an electrical potential across the most positively charged terminal of the plurality of battery modules and the most negatively charged terminal of the plurality of battery modules exceeds 300 V. In some embodiments, the most positively charged terminal and the most negatively charged terminal of the battery may be electrically coupled to a respective busbar (e.g., busbar 212 and/or busbar 214). For example, battery enclosure 200 may comprise an unswitched negative terminal busbar (e.g., busbar 212) and an unswitched positive terminal busbar (e.g., busbar 214). The unswitched negative terminal busbar and the unswitched positive terminal busbar may be components of the high voltage distribution system described herein (e.g., high voltage distribution system 100) depicted in region 202 of battery enclosure 200.

Although the high voltage distribution system (e.g., high voltage distribution system 100) is depicted on a leftmost side of battery enclosure 200, the high voltage distribution system may located in any position of battery enclosure 200 without departing from the scope of the present disclosure. For example, the high voltage distribution system may be located on a rightmost position of battery enclosure 200, on a top position of battery enclosure 200, or a middle position of battery enclosure 200. In some embodiments, the position of high voltage distribution system 100 may be selected based on characteristics of an electric vehicle associated with battery enclosure 200, such as an orientation of battery enclosure 200 within the electric vehicle and/or accessibility (e.g., by users or vehicle service workers) to region 202 of battery enclosure 200. In such embodiments, the position of high voltage distribution system 100 may further be selected to minimize risk of electrical shorting (e.g., due a crash of the electric vehicle or due to an unswitched length of a busbar).

In some embodiments, a dimension (e.g., run length, width, thickness, etc.) and routing of the busbar may be selected based on a desired terminal end and electrical characteristics of a component at the terminal end. For example, a location of a charging port or of a drive unit connector may be in a predetermined location of the battery enclosure (e.g., the charge port may be located in a front of the battery enclosure and the drive unit connector may be located in a rear of the battery enclosure). In such embodiments, the busbars may be routed from a location in the high voltage distribution system (e.g., either fused or unfused) to a location in the battery enclosure (e.g., a charging port or drive unit connector). As depicted in exemplary battery enclosure 200, the charging port comprises one or more contactors.

Figure 3:
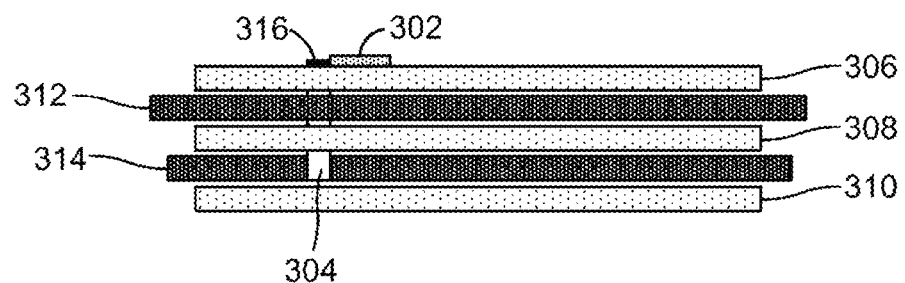
FIGS. 3-5 show cross-sectional views of exemplary high voltage distribution systems, in accordance with some embodiments of the present disclosure.
Figure 4:
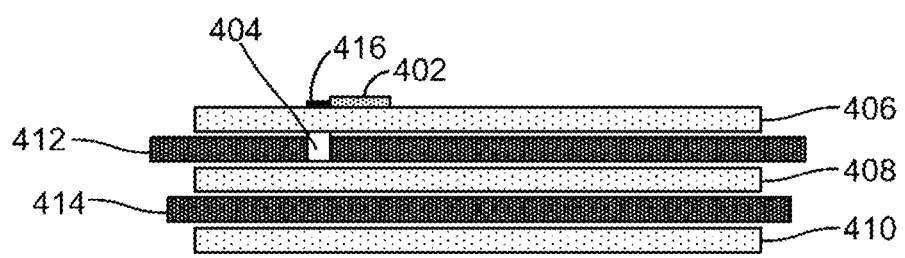
Figure 5:
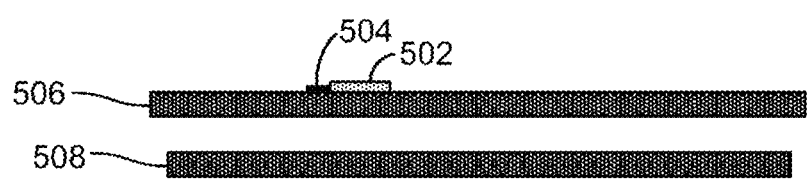

FIGS. 3-5 depict cross-sectional views of exemplary high voltage distribution systems in accordance with the scope of the disclosure. FIG. 3 depicts an exemplary cross-sectional view of laminated busbars electrically coupled to fuses via a vertical interconnect. Exemplary cross-sectional view 300 is depicted having plurality of layers, comprising insulating layers (e.g., insulating layers 306, 308, and 310) and conductive layers (e.g., conductive layers 312 and 314). Insulating layers 306, 308, and 310 may comprise a plurality of electrically insulating materials, such as rubber, plastic, a powder coating, heat shrink, etc. In some embodiments, within the electrically conductive layers (e.g., conductive layers 312 and 314) are one or more busbars (e.g., busbar 102, 104, 106, 108, 212 or 214). In some embodiments, conductive layers 312 and 314 comprise insulating components in addition to electrically conductive components. As described above, the busbars may be electrically coupled to a multitude of electrical components. For example, a busbar in conductive layer 314 may be electrically coupled to a switched 300 V power line associated with a vehicle accessory component, such as an air conditioning compressor. A busbar in conductive layer 312 may be electrically coupled to an unswitched terminal of a battery. For example, a portion of the busbar in conductive layer 312 that extends beyond the insulated layers may be routed to a terminal of the 300 V battery (e.g., the series connection of batteries depicted in FIG. 2). The portion of the busbar in conductive layer 312 may be physically coupled to the terminal of the battery using any suitable physical coupling method (a bolt, rivet, etc.) and may be electrically coupled by virtue of the physical coupling.

In some embodiments, an electrically conductive vertical interconnect (e.g., vertical interconnect 304) passes through the layers of the high voltage distribution system and is electrically coupled to one of the plurality of electrically conductive layers (e.g., conductive layer 312 or 314). In some embodiments, a location of the vertical interconnect may be selected so that the vertical interconnect does not intersect with a busbar on any of the other conductive layers (e.g., a busbar on conductive layer 312). For example, a location of vertical interconnect 304 may be selected such that a busbar in conductive layer 312 does not pass through the location of vertical interconnect 304 but a busbar on conductive layer 314 does pass through the location of vertical interconnect 304. Accordingly, an interconnect selected of an electrically conductive material will be electrically coupled to the busbar on conductive layer 314 but will not be electrically coupled to the busbar on conductive layer 312.

In some embodiments, vertical interconnect 304 passes through a location of both the busbar located in conductive layer 312 and the busbar located in conductive layer 314. In such embodiments, a hole may be drilled through insulating layer 306, conductive layer 312 and insulating layer 308. A wall of the hole may be coated with an insulator to prevent electrical connectivity between any conductors placed in the hole and any conductive layers through which the hole passes (e.g., conductive layer 312). In another example, vertical interconnect 304 may be insulated when passing through certain layers (e.g., conductive layer 312) to prevent an electrical coupling with a busbar. For example, the vertical interconnect may be coated with an insulating material to prevent electrically coupling vertical interconnect with the busbar on conductive layer 312 while allowing for an electrical coupling with the busbar on conductive layer 314. Accordingly, in this example, vertical interconnect 304 is electrically coupled with only the busbar on conductive layer 314.

In some embodiments, vertical interconnect 304 may be electrically coupled to a pad (e.g., pad 316) located on a surface of an insulated layer (e.g., insulated layer 306). For example, vertical interconnect 304 may be electrically coupled to pad 316 on top of insulated layer 306. Pad 316 may provide a region for fuses 302 to be electrically coupled to the vertical interconnect (e.g., via a fuse holder soldered to pad 316). In some embodiments, pad 316 is a top portion of vertical interconnect 304.

FIG. 4 depicts exemplary cross-sectional view 400 having insulating layers 406, 408, and 410 and conductive layers 412 and 414. In some embodiments conductive layers 312 and 314 comprise one or more busbars (e.g., busbars 102, 104, 106, 108, 212 or 214). Vertical interconnect 404 is depicted intersecting insulating layer 406 and conductive layer 412.

In some embodiments, a position of vertical interconnect 404 is selected such that vertical interconnect 404 corresponds to a position of a busbar in conductive layer 412. A vertical interconnect selected of an electrically conductive material will be electrically coupled to the busbar in conductive layer 412. Because vertical interconnect 404 passes through to the electrically conductive layer 412 and is insulated from electrically conductive layer 414 by insulating layer 408, vertical interconnect 404 is electrically coupled to conductive layer 412 and not conductive layer 414. In some embodiments, vertical interconnect 404 is electrically coupled to a pad (e.g., pad 416) which is electrically coupled to one or more fuses (e.g., fuses 402).

FIG. 5 depicts exemplary cross-sectional view 500 having two conductive layers (e.g., conductive layers 506 and 508) a pad (e.g., pad 504) and fuses (e.g., fuses 502). In cross sectional view 500 electrically conductive layer 506 is depicted having an electrical coupling to pad 504. In such embodiments, a position of pad 504 may be selected such that it corresponds to a position of a busbar in conductive layer 506. Fuses 502 may be electrically coupled to the busbar in conductive layer 506 via an electrical coupling to pad 504.

In cross-sectional view 500 no physical insulating layers are depicted, such as those depicted in FIGS. 3 and 4 (e.g., insulating layers 306, 308, 310, 406, 408, and 410). In cross sectional view 500, the vertical spacing between conductive layer 506 and conductive layer 508 may be selected to minimize the risk of a short circuit. For example, the distance between conductive layer 506 and conductive layer 508 may be selected such that the risk of arcing between the two conductive layers is minimized or eliminated. In some embodiments, the plurality of fuses may be electrically coupled to the busbar via a pad on the busbar.

The arrangement of conductive layers, busbars, fuses, insulating layers, and electrical coupling elements (e.g., vertical interconnects, pads, etc.) in FIGS. 3-5 is merely illustrative. Any number of layers, fuses, electrical coupling elements, and any configuration of layers, fuses, or elements may be selected without departing from the scope of the present disclosure. Although the vertical interconnect is described as an interconnect that passes vertically through the layers of the system, any electrically conductive interconnect is possible so long as it provides an electrically conductive connection between a busbar and at least one fuse (e.g., a wire). In some embodiments, the at least one fuse is electrically coupled to a busbar layer without the use of a vertical interconnect (e.g., a pin of a fuse holder is soldered to a conductive surface of a busbar).

Although the power distribution system is described herein with respect to a high voltage system of 300 V, any voltage system (e.g., a low voltage, 12 V system) and any current flow (e.g., AC or DC) may be used without departing from the scope of the invention. In some embodiments, the electrical potential across two busbars may vary. For example, an electrical potential across a first busbar and a second busbar may be 300 V and an electrical potential across a third busbar and the second busbar may be 12 V. In such embodiments, the first busbar may be electrically coupled to the battery module while the third busbar is electrically coupled to voltage reduction circuitry, such as a transformer, regulator, voltage divider, etc. that outputs a 12 V electrical potential. In such embodiments, the voltage reduction circuitry may be electrically coupled to a high power battery module (e.g., a module having an electrical potential of at least 300 V) via an input terminal of the voltage reduction circuitry. The voltage reduction circuitry may output a reduced voltage (e.g., a voltage less than 14 V) via an output terminal of the voltage reduction circuitry. In some embodiments, the output terminal of the voltage reduction circuitry is electrically coupled to the third busbar.

In some embodiments, the plurality of busbars comprise a material having a non-zero electrical resistivity. While an ideal busbar may have a resistivity of zero, materials used to construct the busbars may have a non-zero resistivity. For example, a copper busbar may have a resistivity that is lower than the resistivity of an aluminum busbar. Because of the non-zero resistivity, a measurable voltage drop may occur between a first terminal of the busbar (e.g., a terminal connected to a terminal of the battery module) and a second terminal of the busbar (e.g., a terminal connected to a load). In such embodiments, the material and dimensions of the busbar may be selected such that a voltage drop between the first terminal of the busbar and a second terminal of the busbar is below 14 V while coupled to the load.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
    a first busbar and a second busbar; and
    an electrically conductive interconnect, wherein:
        the electrically conductive interconnect is electrically coupled to the first busbar and passes through the second busbar without an electrical coupling to the second busbar; and
        the electrically conductive interconnect is insulated.

2. The system of claim 1, further comprising an insulator located between the first busbar and the second busbar, wherein the electrically conductive interconnect passes through the insulator.

3. The system of claim 1, further comprising a fuse, wherein the first busbar is electrically coupled to the fuse via the electrically conductive interconnect.

4. The system of claim 1, wherein the first busbar, the second busbar, and the electrically conductive interconnect are located within a battery enclosure.

5. The system of claim 1, wherein the first busbar is located within a first electrically conductive layer, and wherein the second busbar is located within a second electrically conductive layer, and wherein the electrically conductive interconnect passes vertically from the first electrically conductive layer through the second electrically conductive layer.

6. The system of claim 1, further comprising an electrically conductive pad, wherein:
    the electrically conductive pad is located above the second busbar; and
    the electrically conductive pad is electrically coupled to the electrically conductive interconnect.

7. A vehicle comprising:
    a battery enclosure comprising:
        a first busbar and a second busbar; and
        an electrically conductive interconnect, wherein:
            the electrically conductive interconnect is electrically coupled to the first busbar and passes through the second busbar without an electrical coupling to the second busbar; and
            the electrically conductive interconnect is insulated.

8. The vehicle of claim 7, further comprising an insulator located between the first busbar and the second busbar, wherein the electrically conductive interconnect passes through the insulator.

9. The vehicle of claim 7, further comprising a fuse, wherein the first busbar is electrically coupled to the fuse via the electrically conductive interconnect.

10. The vehicle of claim 7, wherein:
the battery enclosure further comprises a plurality of batteries electrically coupled to the first busbar and the second busbar; and
the plurality of batteries provide power to an electric motor.

11. The vehicle of claim 7, wherein the first busbar is located within a first electrically conductive layer, and wherein the second busbar is located within a second electrically conductive layer, and wherein the electrically conductive interconnect passes vertically from the first electrically conductive layer through the second electrically conductive layer.

12. The vehicle of claim 7, further comprising an electrically conductive pad, wherein:
the electrically conductive pad is located above a surface of the second busbar; and
the electrically conductive pad is electrically coupled to the electrically conductive interconnect.

13. A method of manufacturing comprising:
installing a first busbar, a second busbar, and an electrically conductive interconnect in a battery enclosure wherein:
the electrically conductive interconnect is electrically coupled to the first busbar;
the electrically conductive interconnect passes through the second busbar without an electrical coupling to the second busbar; and
the electrically conductive interconnect is insulated.

14. The method of claim 13, further comprising:
installing an insulator between the first busbar and the second busbar.

15. The method of claim 13, further comprising:
electrically coupling a fuse to the electrically conductive vertical interconnect.

16. The method of claim 13, further comprising:
electrically coupling an electrically conductive pad to the electrically conductive interconnect.

17. The method of claim 13, wherein the first busbar is installed in a first electrically conductive layer, and wherein the second busbar is installed in a second electrically conductive layer, and wherein the electrically conductive interconnect is installed vertically from the first electrically conductive layer through the second electrically conductive layer.

* * * * *